United States Patent Office 3,419,086
Patented Dec. 31, 1968

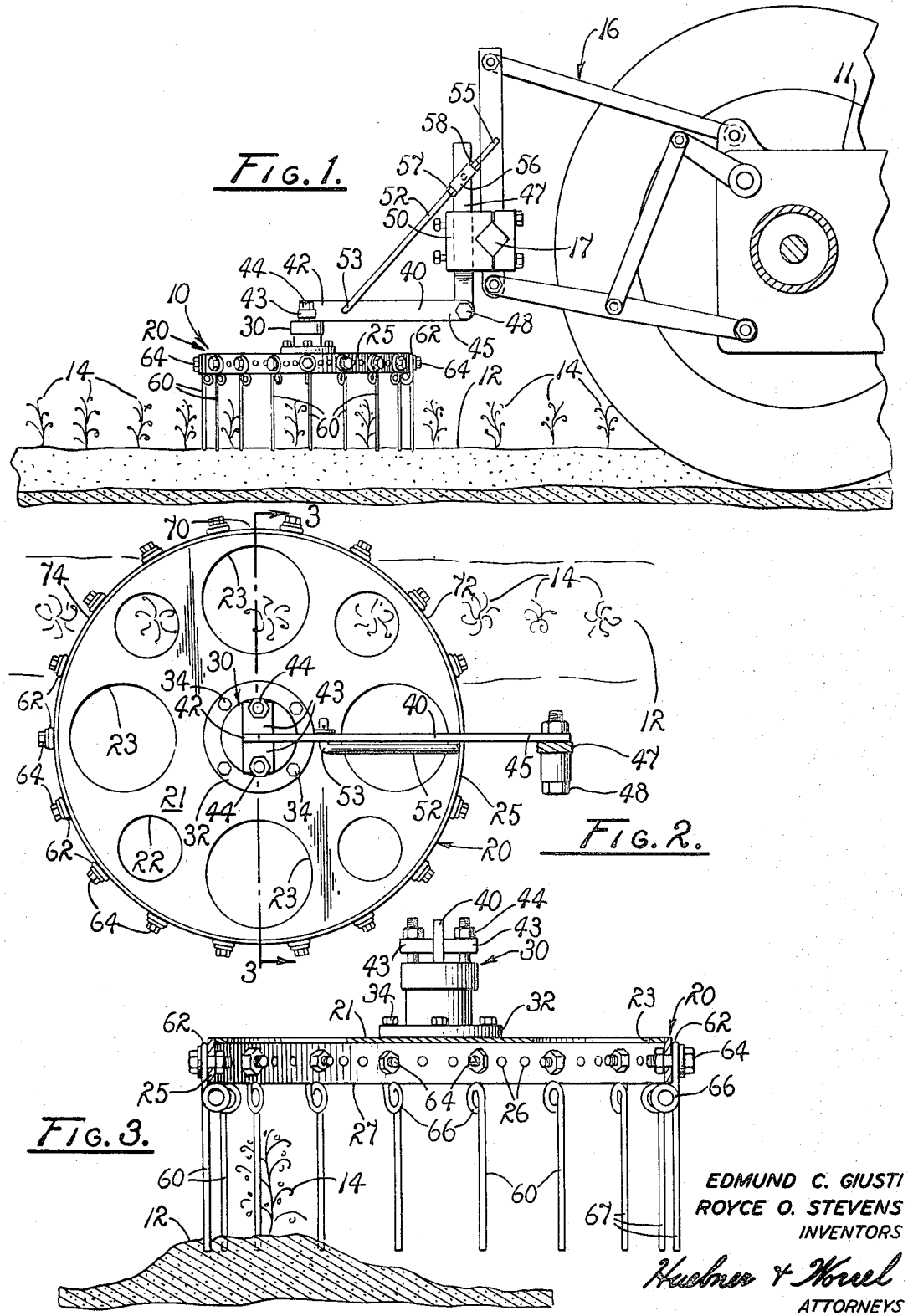

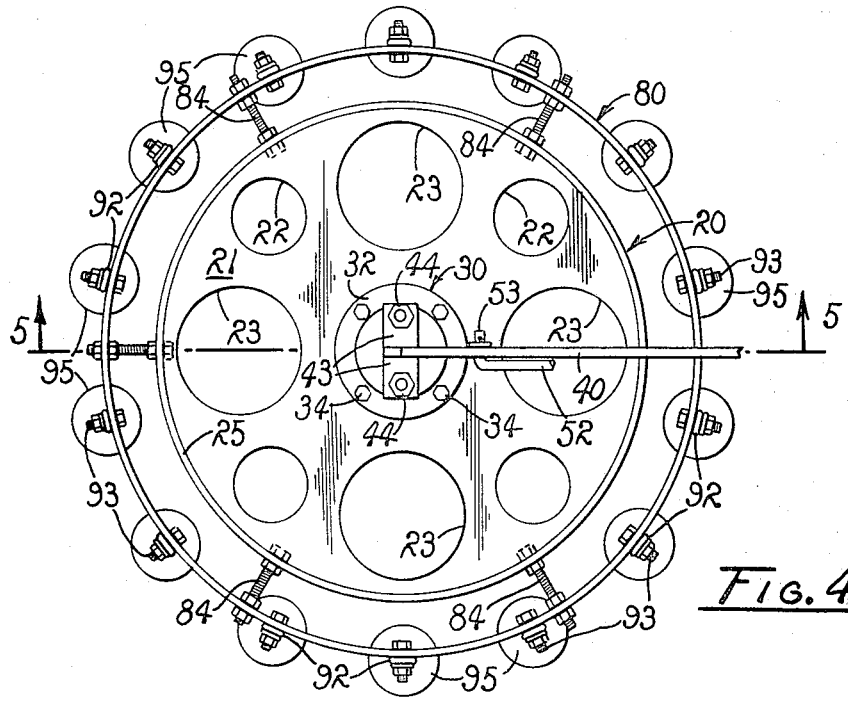
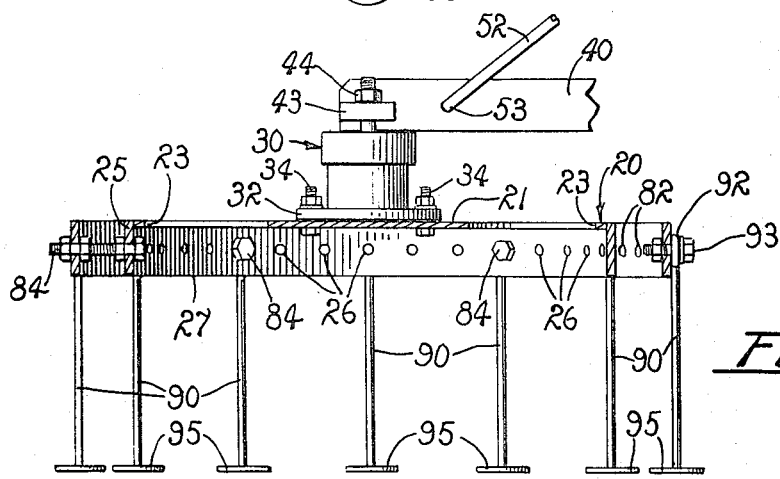
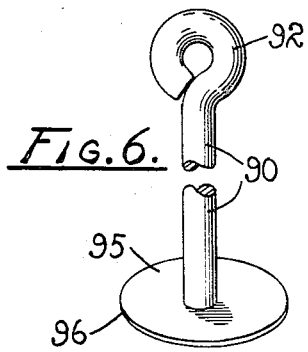
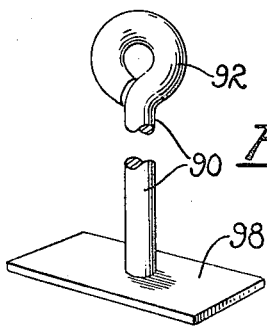
EDMUND C. GIUSTI
ROYCE O. STEVENS
INVENTORS
ATTORNEYS

3,419,086
WEEDING AND MULCHING DEVICE
Edmund C. Giusti, 1046 T St., Fresno, Calif. 93721, and Royce O. Stevens, P.O. Box 66, Kerman, Calif. 93630
Filed Aug. 2, 1965, Ser. No. 476,595
1 Claim. (Cl. 172—523)

ABSTRACT OF THE DISCLOSURE

A weeding and mulching device for rows of plants providing a circular support frame mounted for rotation in a substantially horizontal plane about a substantially vertical axis and disposed above such a row in laterally overlapping relation to the row including a plurality of resiliently flexible earth engaging fingers peripherally depending from the frame with each finger having a coiled portion disposed in a plane radially extended from said axis of the support frame in underlying engagement therewith for stabilizing and permitting controlled flexing of the fingers during their successive movement laterally outwardly and inwardly through the row of plants.

---

The elimination of weeds from row crops with a minimum of disturbance of the desired plants has long been a major problem of row crop farming. Further, the soil along the rows of plants frequently becomes hard-crusted or clodded which hinders seed germination, absorption of moisture into the soil and makes cultivation difficult. While hand-hoeing has been the best available solution, progressively increased labor costs have made it economically unfeasible in many areas. Conventional sweep-type cultivating tools or French plows are usually employed to break up or remove the hard-crusted soil. These tools, when drawn along the rows of plants, slide under the crusted surface and have a tendency to pull up and break off slabs of such compacted surface soil which also cannot be readily worked by subsequent more refined cultivating and weeding tools. Also, the slabs or clods frequently fall on and crush immature plants. Disc cultivators have also been used to cut through and break up clods along such plant rows. However, such discs usually pull soil away from the plants, frequently exposing the roots and must be carefully positioned with respect to the row so as not to damage the plants. Also, these tools are not able to cultivate the soil between the plants and they leave hard ridges longitudinally of the rows which present obstructions to deflect subsequent weeder tools outwardly of the rows. Attempts to overcome such problems have been made by providing toothed wheel type cultivators having a plurality of teeth radially extended therefrom which rotate about substantially horizontal axes and roll over the ground in endwardly penetrating relation. These, too, have not been fully successful in that the teeth thereof tend to penetrate the crusted surface and pry out chunks of clods which either remain wedged within the teeth or are thrown by rotation thereof and scattered indiscriminately about the area being cultivated.

Therefore, it is an object of the present invention to provide an improved weeding and mulching device for soil cultivating.

Another object is to provide such an improved mulching device having a plurality of earth engaging fingers which coact to pulverize the soil closely adjacent to the plants without damaging the same.

Another object is to provide a weeding and mulching device of the character described wherein the fingers, while being drawn longitudinally along the rows, move laterally through the rows in predetermined sequence so as to minimize lifting of the soil in the rows.

Another object is to provide a weeding and mulching device which is capable of effectively destroying weeds in a single pass along the rows while cultivating the soil closely adjacent to the plants.

Other objects and advantages of the present invention will subsequently become more clearly apparent upon reference to the following description and accompanying drawings.

In the drawings:

FIG. 1 is a side elevation of the weeding and mulching device embodying the principles of the present invention shown mounted on a tractor in operating relation to a row of plants.

FIG. 2 is a somewhat enlarged top plan view of the weeding and mulching device disposed in operating position above the row of plants.

FIG. 3 is a transverse vertical section through the weeding and mulching device and the row of plants taken on line 3—3 of FIG. 2.

FIG. 4 is a top plan view of a second form of weeding and mulching device embodying the principles of the present invention.

FIG. 5 is a transverse vertical section of the second form of weeding and mulching device, taken on line 5—5 of FIG. 4.

FIG. 6 is a somewhat enlarged perspective of an earth penetrating finger employed with the weeding and mulching device of the second form having a circular blade portion for forming wider swaths through the rows of plants for thinning purposes.

FIG. 7 is a somewhat enlarged perspective of an alternate form of earth penetrating finger having a modified blade configuration from that of FIG. 6.

Referring more particularly to the drawings, a weeding and mulching device embodying the principles of the present invention is generally indicated by the reference numeral 10. As best shown in FIG. 1, the weeding and mulching device is adapted to be mounted in trailing relation on a conveying vehicle such as a tractor or the like, fragmentarily represented by the reference numeral 11 for movement longitudinally along a hilled row 12 having a plurality of substantially equally spaced plants 14. The tractor 11 provides a conventional three-point hitch, generally indicated at 16, which mounts an elongated transversely extended tool mounting bar 17 which is elevationally adjustable by manipulation of the hitch in the well-known manner.

The weeding and mulching device 10 provides a substantially circular support frame or wheel 20 providing a substantially flat upper surface 21 having a plurality of circular cut outs 22 and 23 to reduce the weight of the frame. The wheel has a peripherally depending annular flange 25 through which is formed a plurality of substantially equally spaced bolt holes 26. The flange provides a lower annular edge 27 lying in a plane disposed in spaced substantially parallel relation to the upper surface 21 of the wheel 20.

The support wheel 20 is mounted for rotation about a substantially vertical axis on a rotatable hub 30 having a lower flange 32 bolted to the upper surface 21 of the wheel in concentric relation therewith by a plurality of bolt and nut assemblies 34. An elongated wheel mounting arm 40 is provided having a rearward end 42 having a pair of transversely oppositely extended mounting ears 43 connected to the hub 30 by a pair of bolts 44. The arm includes an opposite forward end 45 which is pivotally mounted on the lower end of a substantially upright tool mounting shank 47 by a pivot bolt and nut assembly 48. The shank is adjustably mounted by a bracket 50 on the tool bar 17.

An elongated adjusting rod 52 provides a lower angular end 53 extended through the mounting arm 40 closely adjacent to the hub 30. The rod provides a forwardly upwardly inclined screw threaded end 55 which is slidably extended through an elongated sleeve 56 pivotally mounted on the upper end of the shank 47 to provide a trunnion support for the rod. A pair of lock nuts 57 and 58 are screw threadably mounted on the upper end of the rod on opposite sides of the sleeve to tighten against the sleeve for axially constraining the rod to provide a fine degree of elevational positioning of the mounting arm and support wheel 20.

A plurality of elongated earth engaging cultivating fingers 60 are mounted on the flange 25 of the wheel in circumscribing equally spaced depending relation therefrom. The fingers include upper looped ends 62 through which are individually extended mounting bolt and nut assemblies 64 disposed through the bolt holes 26 in the flange 25. The fingers include a continuous coiled portion 66, the coils of which are disposed in a plane substantially right angularly related to the plane of the upper looped end and provide upper peripheral portions engaging the lower edge 27 of the flange. Each of the fingers provides an integral substantially straight lower earth engaging end 67 downwardly extended from its coiled portion.

As best shown in FIG. 2, the bracket 50 is disposed on the tool bar 17 in a position to dispose the vertical axis of rotation of the support wheel 20 transversely outwardly of one side of the row 12 so as to dispose the lateral peripheral portion 70 of the wheel in overlapping relation to the row 12. With forward earth traversing movement of the tractor 11 progressing in a direction from left to right, as viewed in FIGS. 1 and 2, the support wheel provides a leading peripheral portion 72 and an opposite rearwardly disposed trailing peripheral portion 74 superimposed on the row. While only one weeding and mulching device is shown, it is apparent that a number of such devices can be mounted in transversely spaced relation along the tool bar 17 in the same association with adjacent rows, as that shown in FIG. 2.

Second form

A second form of weeding and mulching device embodying the principles of the present invention is shown in FIGS. 4 through 7. Such second form utilizes the support wheel 20, mounting arm 40 and associated mechanism of the first form for connection to the tractor 11. The second form distinguishes in its provision of an annular hoop or ring 80 of a diameter substantially larger than the diameter of the support wheel. Like the flange 25 of the wheel, the ring has a plurality of bolt receiving holes 82 disposed therethrough in equally closely spaced relation around the ring. The ring is mounted concentrically in circumscribing relation about the wheel by a plurality of circumferentially spaced radially extended spacer bolt and nut assemblies 84 disposed through the holes 82 and 26.

The second form of weeding and mulching device provides a plurality of earth engaging cultivatng fingers 90 which are adapted to be mounted in depending relation from the ring 80 in a manner similar to the mounting of the fingers 60 on the flange 25 of the support wheel 20. It is apparent, however, that the fingers 90 are shown associated with the second form may also be utilized with the first form to reduce the spaces between the swaths formed by the fingers through the rows.

As best shown in FIG. 6, each of the fingers 90 includes an upper looped end 92 through which is extended a mounting bolt and nut assembly 93 for maintaining the fingers in the described position with respect to the ring. Each of the fingers provides a substantially straight lower portion which mounts at its lower end a circular substantially flat blade 95 having a continuous peripherally disposed cutting edge 96. The fingers 90 may be alternately provided at their lower ends with a substantially rectangular blade which is indicated by the reference numeral 98 in FIG. 7. As shown, the longitudinal axis of the rectangular blade is disposed in a substantially common plane with the plane of the upper looped portion 92 of the fingers. Whichever blade is employed, it is noted that during rotation of the support wheel and ring the fingers and their respective blade portions encounter the soil in passes transversely of the rows so as laterally to slice through the rows beneath the surface of the soil while the lower portions of the fingers mulch and cultivate the upper crust as in the first form.

Operation

The operation of the described embodiments of the subject invention is believed to be clearly apparent and is briefly summarized at this point. With the leading and trailing peripheral portions 72 and 74, respectively, adjacent to the lateral peripheral portion 70 disposed above the row, the hitch 16 is manipulated to lower the support wheel 20 to dispose the lower ends 67 of the fingers 60 in earth penetrating relation to a desired depth. As best shown in FIG. 3, only the teeth at the lateral peripheral portion 70 and the leading trailing peripheral portions 72 and 74 are engaged with the row and the fingers at the opposite peripheral portions of the wheel are disposed above the furrow between the adjacent rows completely free of any earth engagement.

The depth of earth penetration of the fingers 60 can be further precisely adjusted by loosening the lock nuts 57 and 58 to lower or raise the support wheel by appropriate extension or retraction of the adjusting rod 52 through the sleeve 56. With the fingers disposed in the desired earth penetrating relation on one side of the support wheel and upon earth traversing movement of the tractor 11 in a direction from left to right, as viewed in FIG. 1, the support wheel is rotated about its vertical axis on the hub 30 in a counterclockwise direction, as viewed in FIG. 2. This movement causes the fingers to be successively drawn substantially laterally through the row 12 in closely spaced adjacent relation to the plants 14. Each finger moves substantially transversely outwardly through the row at the leading peripheral portion 72 of the wheel, substantially longitudinally along the row at the lateral peripheral portion 70 of the wheel and thence returns laterally inwardly through the row at the trailing peripheral portion 74 of the wheel. With such arrangement, successive fingers pass on opposite sides of the individual plants 14 in the row during the described lateral movement at the leading and trailing peripheral portions of the wheel. Consequently, weeds, disposed between the plants in the row are effectively uprooted and removed while substantially all the soil surrounding the plants is loosened and pulverized with a minimum of damage to the plants.

Depending upon the particular spacing of the plants, the fingers 60 can be correspondingly spaced about the flange 25 of the wheel to provide the optimum weeding and cultivating effect without damage to the plants. It is also recognized that the speed of the tractor 11 and the velocity of rotation of the wheel also effect the operating characteristics of the weeding and mulching device. Such operating speeds, however, will be easily determined by the operator when working in plant rows of various sizing and spacing. It is further significant that the coiled portions 66 of the fingers are engaged with the lower edge 27 of the support wheel 20. With such arrangement, the stresses encountered and developed within the fingers are absorbed by the wheel flange with the coiled portions further precluding any turning of the fingers about their upper looped ends 62.

Operation of the second form

The operation of the second form is substantially identical to the operation of the first form except for the wider swaths formed through the rows by the blades 95 and 98 on the fingers 90. Accordingly, the second form of mulching and weeding device has particular utility for initialing thinning plants from the rows when such operation is desirable. As previously noted, the fingers 90 may be attached directly to the flange 25 of the support wheel 20 of the first form when it is desired to provide a minimum of spacing between the swaths formed by the blades of the fingers. However, in certain row crops, such as cotton and the like, a wider spacing is desired to leave a maximum number of plants between the swaths as provided by attachment of the mounting ring 80 to the support wheel 20. With the wider diameter circle of the ring, the fingers and their respective blades follow a wider arc of travel through the rows so as to extend the period of soil engagement. It is further apparent that virtually any swath spacing can be provided between the two forms of the present invention by regulating the spacing between the fingers on the support wheel or the mounting ring. During rotation of the support wheel and ring, the blades of the fingers transversely encounter the row so that the blades have a lateral slicing effect through the roots of weeds and the like and further enhances the mulching effect on the upper crust of the soil by the lower portions of the fingers.

In view of the foregoing, it is readily apparent that the structures of the embodiments of the present invention provide improved weeding and mulching of the soil in a manner substantially completely to remove weeds and the like from between the plants in rows and substantially completely to cultivate the soil around the plants with a minimum of damage thereto. The resiliently flexible fingers continually rotate with the substantially horizontally disposed support wheel which enables each finger laterally to move alternately outwardly and inwardly through the row between the plants with each revolution of the wheel. It is also significant that the fingers and the blades provided by the second form laterally encounter the soil in the plant rows so as substantially to preclude penetration of clods and the like by the fingers as in conventional toothed weeders.

Although the invention has been herein shown and described in what are conceived to be the most practical and preferred embodiments, it is recognized that departures may be made therefrom within the scope of the invention.

Having described our invention, what we claim as new and desire to secure by Letters Patent is:

1. A weeding and mulching device adapted to be mounted for earth traversing movement in a predetermined forward direction of travel longitudinally of a row of plants comprising a circular support frame having an annular peripheral depending flange providing an outer peripheral surface and a lower edge mounted for rotation in a substantially horizontal plane about a substantially vertical axis transversely offset from the row to dispose a peripheral portion of the support frame in laterally overlapping relation above the row, said flange of the support frame providing a leading periphery and a trailing periphery with respect to said forward direction of travel along the row of plants; a plurality of resiliently flexible fingers individually providing upper looped ends; and means extended through said looped ends individually mounting said fingers in suspended relation from the outer peripheral surface of said flange of the support member in equally circumferentially spaced relation, said fingers terminating in lower earth engaging ends and having upper coiled portions disposed in planes right angularly related to said upper looped end and in radial extension from said vertical axis of the support frame permitting controlled flexing of the fingers in a direction substantially perpendicular to said planes laterally against said coiled portions of the fingers with said coiled portions underlying and engaging said lower edge of the support frame to preclude rotation of the fingers about their upper looped ends during successive movement of the lower ends of the fingers laterally outwardly through the row of plants at said leading periphery of the support frame, and at the trailing periphery said lower ends of the fingers returning laterally inwardly through the row of plants during rotation of the support frame incident to said earth traversing movement of the device along the row.

References Cited

UNITED STATES PATENTS

| | | | |
|---|---|---|---|
| 951,024 | 3/1910 | Parker | 400—11 |
| 1,591,925 | 7/1926 | Martin | 172—169 |
| 2,879,855 | 3/1959 | Kleiser | 172—526 |
| 3,006,423 | 10/1961 | Buddingh et al. | 172—523 |
| 3,082,829 | 3/1963 | Buddingh et al. | 172—526 |
| 3,093,954 | 6/1963 | Johnston | 56—377 |
| 3,322,204 | 5/1967 | Bezzerides | 172—543 |

FOREIGN PATENTS 942,677    11/1963    Great Britain.

ABRAHAM G. STONE, *Primary Examiner.*

S. C. PELLEGRINO, *Assistant Examiner.*

U.S. Cl. X.R.

172—543